(12) United States Patent
Speckbacher et al.

(10) Patent No.: US 10,272,600 B2
(45) Date of Patent: Apr. 30, 2019

(54) METHOD OF MANUFACTURING A COMPOSITE SKIN-FOAM-CARRIER COMPONENT FOR A MOTOR VEHICLE AND COMPOSITE SKIN-FOAM-CARRIER COMPONENT FOR A MOTOR VEHICLE

(71) Applicant: Lisa Draexlmaier GmbH, Vilsbiburg (DE)

(72) Inventors: Hubert Speckbacher, Muehldorf (DE); Thomas Winterhoff, Vilsbiburg (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 15/901,914

(22) Filed: Feb. 22, 2018

(65) Prior Publication Data
US 2018/0236697 A1    Aug. 23, 2018

(51) Int. Cl.
    *B29C 44/12*      (2006.01)
    *B29C 45/00*      (2006.01)
    (Continued)

(52) U.S. Cl.
CPC ...... *B29C 45/0017* (2013.01); *B29C 44/1228* (2013.01); *B29C 70/02* (2013.01); *B29D 99/0021* (2013.01); *B60R 21/215* (2013.01); *B60R 21/2165* (2013.01); *B60R 21/235* (2013.01); *B29L 2031/3038* (2013.01); (Continued)

(58) Field of Classification Search
CPC ... B29C 44/184; B29C 44/185; B29C 53/025; B29C 66/851; B29C 66/8511; B29C 45/0003; B29C 45/0081; B29C 37/0057; B29C 2045/2695; B29C 59/007; B29C 2043/022; B29C 66/549
See application file for complete search history.

(56) References Cited

U.S. PATENT DOCUMENTS

| | | | |
|---|---|---|---|
| 5,082,310 A | * | 1/1992 | Bauer .......... B26D 3/085 280/728.3 |
| 5,611,564 A | | 3/1997 | Bauer |

(Continued)

FOREIGN PATENT DOCUMENTS

| | | |
|---|---|---|
| AT | 006084 | 4/2003 |
| CN | 1259913 | 7/2000 |

(Continued)

OTHER PUBLICATIONS

First Office Action dated Sep. 20, 2018 in corresponding CN application 201810153391.9.

*Primary Examiner* — Stella K Yi
(74) *Attorney, Agent, or Firm* — Burris Law, PLLC

(57) ABSTRACT

The present disclosure relates to a method of producing a composite skin-foam-carrier component for a motor vehicle, including the steps of injection-molding a carrier having one or more airbag flaps delimited by a hinge area and by a predefined tear line, wherein a raised contour with a groove-shaped cross-section is created along a segment of the tear line, producing a foam layer between a skin and the injection-molded carrier, producing gaps in the raised contour by guiding a tool over the raised contour after the production of the foam layer, and removing a portion of the raised contour. The present disclosure also relates to a composite skin-foam-carrier component for a motor vehicle.

20 Claims, 4 Drawing Sheets

(51) Int. Cl.
*B29C 70/02* (2006.01)
*B29D 99/00* (2010.01)
*B29L 31/30* (2006.01)
*B60R 21/215* (2011.01)
*B60R 21/235* (2006.01)
*B60R 21/2165* (2011.01)

(52) U.S. Cl.
CPC .............. *B60R 2021/23523* (2013.01); *B60R 2021/23557* (2013.01)

(56) References Cited

U.S. PATENT DOCUMENTS

| | | |
|---|---|---|
| 6,726,239 B1 | 4/2004 | Teranishi et al. |
| 2001/0000418 A1 | 4/2001 | Kreile |

FOREIGN PATENT DOCUMENTS

| | | | |
|---|---|---|---|
| CN | 1291148 | | 4/2001 |
| CN | 101102921 | | 1/2008 |
| CN | 102019899 | | 4/2011 |
| CN | 102099227 | | 6/2011 |
| CN | 103318123 | | 9/2013 |
| DE | 29720138 | | 3/1998 |
| DE | 10219522 | | 11/2003 |
| DE | 102005037939 | * | 2/2007 |
| EP | 0916555 A2 | | 5/1999 |
| JP | 2001088646 A | | 4/2001 |
| JP | 2006062422 | | 3/2006 |
| JP | 2014234132 | | 12/2014 |

* cited by examiner

METHOD OF MANUFACTURING A COMPOSITE SKIN-FOAM-CARRIER COMPONENT FOR A MOTOR VEHICLE AND COMPOSITE SKIN-FOAM-CARRIER COMPONENT FOR A MOTOR VEHICLE

CROSS-REFERENCE TO RELATED APPLICATIONS

This application claims priority to and the benefit of German Patent Application No. DE 10 2017 103 590.7 filed on Feb. 22, 2017. The disclosure of the above application is incorporated herein by reference.

FIELD

The present disclosure relates to a method of manufacturing a composite skin-foam-carrier component for a motor vehicle and to a composite skin-foam-carrier component for a motor vehicle.

BACKGROUND

The statements in this section merely provide background information related to the present disclosure and may not constitute prior art.

Using composite skin-foam-carrier components to produce instrument panel supports for motor vehicles is known per se. For example, a composite skin-foam-carrier component of this type is shown in DE 102 19 522 A1. The composite component includes a carrier and a skin, with a foam layer formed in between. In an area below which a passenger airbag is to be arranged, both the carrier and the foam layer have a material weakening that defines an airbag flap in the composite component. The flap partially ruptures and flips open when the passenger airbag is activated, thereby allowing the passenger airbag to unfold into the vehicle interior.

EP 0 916 555 A2 shows a cover device for a passenger airbag that is arranged in the area of a dashboard. The cover device has an H-shaped airbag flap capable of rupturing and flipping open in the event of deployment of the passenger airbag. Particularly if airbag flaps of this type are to be integrated into composite skin-foam-carrier components, it may become difficult to produce material weakenings such as gaps with any degree of process reliability.

In one known procedure, lasers are used to produce material weaknesses in the form of gaps in order to facilitate the rupturing of this type of airbag flap. For example, DE 10 2005 037 939 A1 shows a composite skin-foam-carrier component for a motor vehicle. This composite component has an airbag flap delimited by a hinge area and a predefined tear line. To make it possible for the airbag flap to tear open in the area of the tear line, the carrier material and the foam layer are perforated with a laser during the manufacture of the composite component. The skin, or rather the skin layer of the composite component, which usually faces the vehicle interior and forms a visible part, could possibly be damaged if such a laser is used.

As an alternative, it would also be possible, for instance, to use a material-removing tool such as a cutter to weaken such a tear line or in other words to remove material. However, the risk involved with this is that a cutter is very difficult to guide precisely along the tear line. In addition, using a cutter on composite skin-foam-carrier components of this type involves the risk of gouging off at least part of the foam layer, possibly resulting in undesired indentations in the composite component. The result of both of these risks may be that the process of rupturing the airbag flap upon deployment of an airbag is undefined, and in particular that it may not follow the desired contour, namely the predefined tear line. Moreover, if the material weakening does not precisely follow the tear line and the foam layer is partly gouged off, an undesired particle flight upon activation of an airbag may result. In such a case, parts of the foam layer of the composite component could be propelled into the vehicle interior.

In general, shaping and processing a composite component of this type to produce material weaknesses in the area of a predefined tear line of an airbag flap can generate chips that invade the vehicle interior in the form of a particle flight, at the latest when the airbag is deployed, causing and the airbag flap to tear open.

SUMMARY

The present disclosure provides a method of producing a composite skin-foam-carrier component and a composite skin-foam-carrier component, by means of which an airbag flap in such a composite component can be reliably opened.

In one form, a method of producing a composite skin-foam-carrier component and by a composite skin-foam-carrier component with the features of the independent claims. Advantageous forms, with suitable and non-trivial further developments of the present disclosure, are described in the dependent claims and throughout the application.

In a method of the present disclosure for producing a composite skin-foam-carrier component for a motor vehicle, a carrier is produced by injection molding. The carrier comprises one or more airbag flaps delimited by a hinge area and a predefined tear line, wherein a raised contour with a groove-shaped cross-section is produced along a segment of the tear line. The tear line does not necessarily have to be a visible line. The tear line is a predetermined line that defines where the airbag flap is supposed to tear or rupture in the event that an airbag arranged underneath the airbag flap is deployed.

In one form, the raised contour is a sort of bulge with a groove-shaped cross-section. Thus, the portion of the raised contour that protrudes above the rest of the carrier encloses a cavity. For example, the raised contour may be like a single wave of a corrugated sheet-metal roof.

In addition, as part of a method according to the present disclosure, a foam layer is produced between a skin and the injection-molded carrier. For example, a synthetic material provided with a blowing agent can be injected between the skin and the injection-molded carrier. In that case it is desired that both the skin and the injection-molded carrier are tight, with no through holes, as otherwise the synthetic material forming the foam layer and provided with a blowing agent would escape to the outside through the skin and/or the injection-molded carrier.

Following production of the foam layer, gaps are created in the raised contour of the carrier. In one form, this is done by guiding a tool over the raised contour, thereby removing a portion of the raised contour. For example, the tool may be a cutter head guided in wavy lines over the raised contour, so that at least a sort of groove base of the groove-shaped cross-section is removed by the cutter head. This results in the formation of the aforementioned gaps in the raised contour.

To produce the gaps, the tool is preferably guided repeatedly in a transverse direction, particularly in wavy lines, over the raised contour. The term transverse should be understood to mean that the tool is moved over the raised contour transversely to the main direction in which it extends, so that in some areas a portion of the raised contour is removed. Thus, during the removal of the contour, the tool is moved transversely to the course of the aforementioned segment of the tear line. To produce the gaps, the tool dips into the raised contour as far as necessary until the gaps are created.

Another desirable aspect of the present disclosure relates to producing the raised contour with its groove-shaped cross-section. This contour, which protrudes distinctly above the remainder of the carrier, is especially easy to process in order to produce the gaps or material weakenings on the raised contour and thus at least in a segment of the predefined tear line.

In yet another form, the raised contour is made with a uniform width. The groove-shaped cross-section of the raised contour is therefore uniform along the entire length of the raised contour. If the tool is guided in wavy lines along the raised contour to produce the gaps, this automatically produces gaps with uniform measurements, lined up one behind the other, and extending along the aforementioned segment of the tear line. Thus, the carrier is perforated in the area of the predefined tear line in an especially simple and reproducible manner by producing the gaps in the raised contour.

Providing the raised contour also allows a relatively wide or thick tool such as a cutter to be used to produce the gaps. As a result, the tool is relatively sturdy and rigid. This inhibits wobbling at the tool while it is being used to partly remove the raised contour in places to produce the gaps. The width of the gaps is determined by the formation of the raised contour and the length of the gaps by the width of the tool being used. For example, a cutter head 5 mm in diameter can be used. In this case the gaps would have a length of at least 5 mm. However, the width of the gaps is not affected by the diameter of the cutter head. In addition, a simple change of a tool program enables variation of the length and the weakening of the carrier in the area of the raised contour. The width of the raised contour and hence also the width of the gaps produced is defined reliably in the injection-molding tool. On the whole, with a method of the present disclosure, an especially simple possibility arises of producing gaps along a predefined tear line in a composite skin-foam-carrier component, so that an airbag flap of the composite component can reliably rupture and flip open when the airbag is deployed. In this way, the aforementioned undesired particle flight in particular can be inhibited when the airbag flap tears open.

An advantageous form of the present disclosure provides that the groove-shaped cross-section of the raised contour is produced in the shape of a V-section, U-section or trapezoidal section. The groove-shaped cross-section, for example, may be cut down to its groove base. As an alternative it is also possible to remove only a small portion of a tip of the raised contour, for instance by cutting, depending on the form of the groove-shaped cross-section.

Another advantageous form of the present disclosure provides that the raised contour is produced on a side of the carrier facing away from the skin. This makes it possible to cut the raised contour very easily with the tool, to produce the gaps.

In another advantageous form of the present disclosure, an airbag hinge mesh or an airbag hinge sheet metal is attached to the carrier and connects the airbag flap to the rest of the carrier beyond the hinge area. The airbag hinge mesh is in one form a woven fabric, for instance a fabric mat. It may be arranged on the carrier and then be overmolded with plastic, so that the airbag hinge mesh is securely connected to the carrier.

The airbag hinge mesh provides that in the event of the airbag flap tearing open, the flap remains reliably connected in the hinge area to the rest of the carrier. The airbag hinge mesh therefore provides the actual flexible connection of the airbag flap to the rest of the carrier in the event of deployment of the airbag and the resulting tearing open of the airbag flap along the tear line. An airbag hinge sheet metal may also be used instead of the airbag hinge mesh, which has the same function as the airbag hinge mesh.

In a further advantageous form of the present disclosure, the airbag hinge mesh is at least partly slit in the area where the tear line of the airbag cover is located. Thus, the airbag hinge mesh offers little to no resistance to the expanding airbag in the slit areas. The slit areas of the airbag hinge mesh define force application points for the expanding airbag, from which the airbag can tear the carrier open. Providing the airbag hinge mesh with slits at least in the areas in which it is arranged at the tear line of the airbag cover results in a controlled rupturing of the airbag flap up to the hinge area, which the airbag flap then flips over or swings open.

In another advantageous form of the present disclosure, the material adjacent the carrier is weakened at the raised contour and the material weakening extends along an additional segment of the tear line. The material weakening guides the tearing-open process of the airbag flap along the additional segment of the tear line, thereby ensuring that the airbag flap also reliably ruptures along the tear line. For example, the material weakening may also be in the form of a through hole. For this purpose a raised contour may likewise be produced initially in the area where the material weakening is to be created. Then, it is also processed with the tool to produce a gap.

An additional advantageous form of the present disclosure provides that the hinge area is produced in the form of a depression protruding into the foam layer. This facilitates a controlled folding over of the airbag flap around the hinge area. As an alternative or additionally, the hinge area may also be produced with a smaller thickness than the airbag flap. The smaller wall thickness of the hinge area likewise facilitates a folding over of the airbag flap around this hinge area when an airbag is deployed.

Another advantageous form of the present disclosure provides that the tear line of the airbag cover is predefined to form an H-shaped or a U-shaped airbag flap. In the case of an H-shaped airbag flap the airbag flap includes two areas designed to swing open in opposing directions as soon as an airbag is deployed. With this H-shaped airbag flap, the maximum force by the expanding airbag is exerted in the middle of the airbag flap. This is one of the reasons why the tear line also runs there and the raised contour in which the aforementioned gaps are created is likewise produced precisely there. An H-shaped airbag flap is particularly advantageous whenever there is to be an especially small space between the composite component, which may be an instrument panel carrier, and a windshield, as in a sports car. On the other hand, a U-shaped airbag flap may be used if there is to be a relatively large space between the composite component and a windshield.

The composite skin-foam-carrier component for a motor vehicle in accordance with the present disclosure includes an injection-molded carrier having one or more airbag flaps delimited by a hinge area and by a predefined tear line, wherein a raised contour with a groove-shaped cross-section extends along a segment of the tear line. In addition, the composite skin-foam-carrier component has a foam layer arranged between a skin and the injection-molded carrier. Furthermore, several gaps arranged one behind the other are provided on the raised contour. Advantageous forms of the method of the present disclosure are to be viewed as advantageous forms of the composite skin-foam-carrier component of the present disclosure.

Further areas of applicability will become apparent from the description provided herein. It should be understood that the description and specific examples are intended for purposes of illustration only and are not intended to limit the scope of the present disclosure.

Additional advantages, features and details of the present disclosure will become apparent from the following description of one form and on the basis of the accompanying drawings. The features and combinations of features mentioned above in the description and the features and combinations of features mentioned below in the description of the drawings and/or merely shown in the drawings may be used not only in the given combination, but also independently, without abandoning the scope of the present disclosure.

The above-described properties, features and advantages of the present disclosure, as well as the manner in which they are achieved, will become clearer and more easily understood in the following schematic description of one form, and they are explained below in greater detail with reference to the drawings. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

A composite skin-foam-carrier component 1 is shown by sections in a plan view. The composite skin-foam-carrier component 1 is an instrument panel support. The particular section of the composite skin-foam-carrier component 1 shown here accommodates an H-shaped airbag flap 2. The application of force 3 by an airbag when it is deployed is also shown schematically by the dashed lines. The airbag flap 2 has hinge areas 4 on opposite longitudinal sides, around which the individual elements of the airbag flap 2 are capable of folding over in the event of airbag deployment. Aside from the two hinge areas 4, the airbag flap 2 is delimited by an H-shaped tear line 5. The tear line 5 defines where the airbag flap 2 is torn open when the airbag deploys. However, the H-shaped tear line 5 as such does not have to be visible or have a physical shape. The airbag flap 2 as such is designed so as to be hidden from view from the vehicle interior. Thus, it is not possible by looking at the installed composite skin-foam-carrier component 1 to see where the airbag flap 2 is located.

Figure 1:
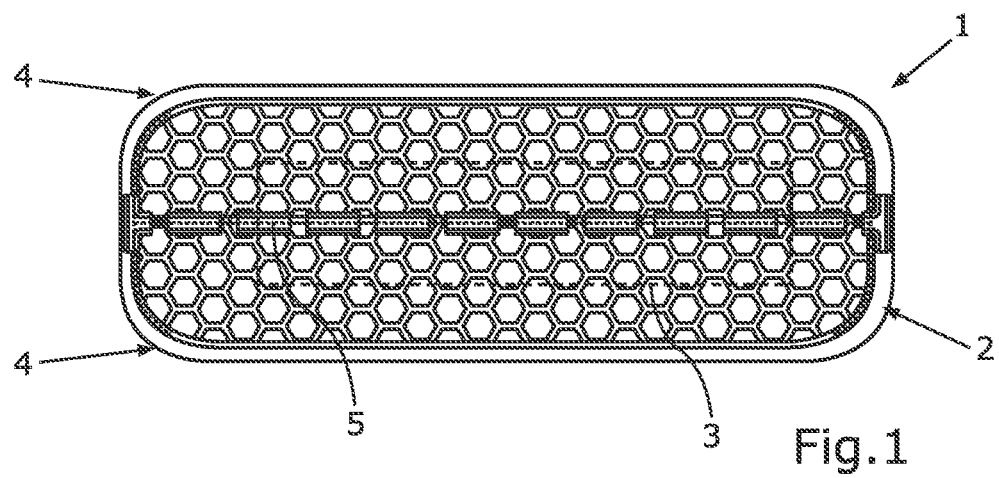
FIG. 1 shows a partial plan view of a composite skin-foam-carrier component in the form of an instrument panel support, showing an H-shaped airbag flap as part of the composite component and constructed in accordance with the teachings of the present disclosure.
Figure 2:
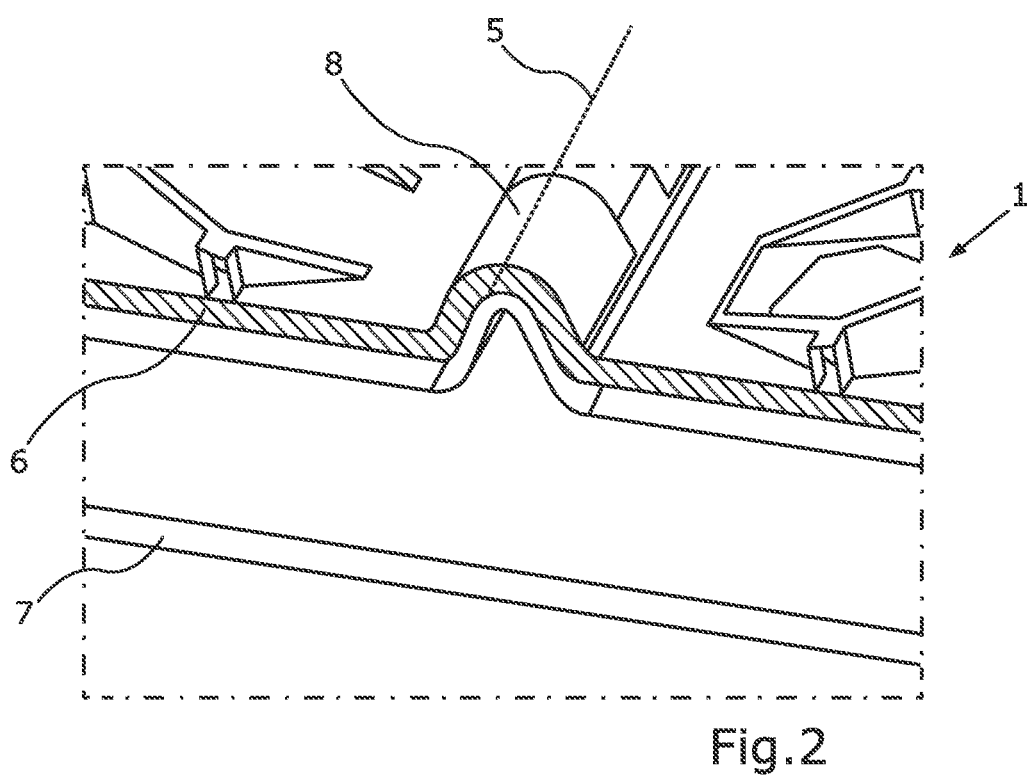
FIG. 2 shows a perspective detail view of the composite skin-foam-carrier component, with a visible carrier and skin, each forming respective outer sides of the composite component, wherein a raised contour with a groove-shaped cross-section is formed on the side of the skin facing away from the carrier in accordance with the teachings of the present disclosure.

FIG. 2 shows an enlarged partial view of the composite skin-foam-carrier component 1. The composite skin-foam-carrier component 1 includes a carrier 6 and what is referred to as a skin 7, between which a foam layer not shown in greater detail here is arranged. The skin 7 is a decor layer facing the vehicle interior, which makes it visible to vehicle occupants. The carrier 6 is produced by injection molding; it includes the H-shaped airbag flap 2. The airbag flap 2 delimited by the hinge areas 4 and by the predefined tear line 5 also has a raised contour 8 with a groove-shaped cross-section. During injection molding of the carrier 6, this raised contour 8 is produced with the groove-shaped cross-section running along a segment of the tear line 5, namely precisely where the airbag flap 2 tears open in the middle as soon the airbag deploys. The raised contour 8 is produced initially with an unbroken surface, since the aforementioned foam layer is produced between the skin 7 and the carrier 6 after the injection molding of the carrier 6.

Figure 3:
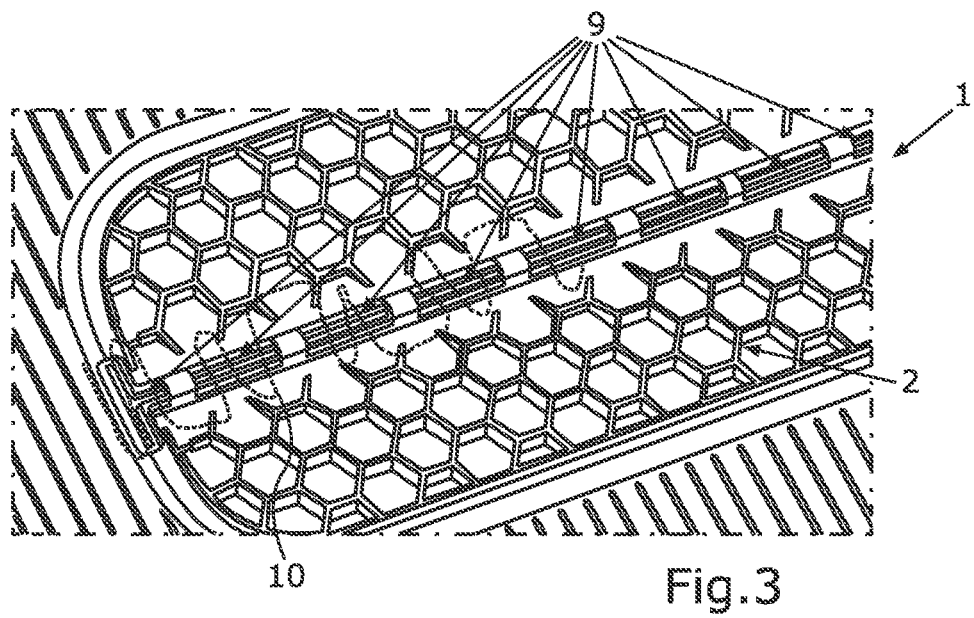
FIG. 3 shows a schematic perspective view onto the area of the airbag flap of the composite skin-foam-carrier component, in which a wavy line illustrates the path of a cutting tool guided along the raised contour, thereby forming several gaps arranged one behind the other on the raised contour in accordance with the teachings of the present disclosure.

An additional step in the production of the composite skin-foam-carrier component 1 is shown in a perspective detail in FIG. 3. A wavy line 10 schematically illustrates the guiding of a cutter head not shown here. The cutter head is guided along the wavy line 10 over the raised contour 8 produced beforehand. By this means several gaps 9, i.e. through holes, are produced one behind the other on the raised contour 8. A portion of the raised contour 8 is thus removed, so that only individual segments of the previously continuous raised contour 8 remain.

Figure 4:
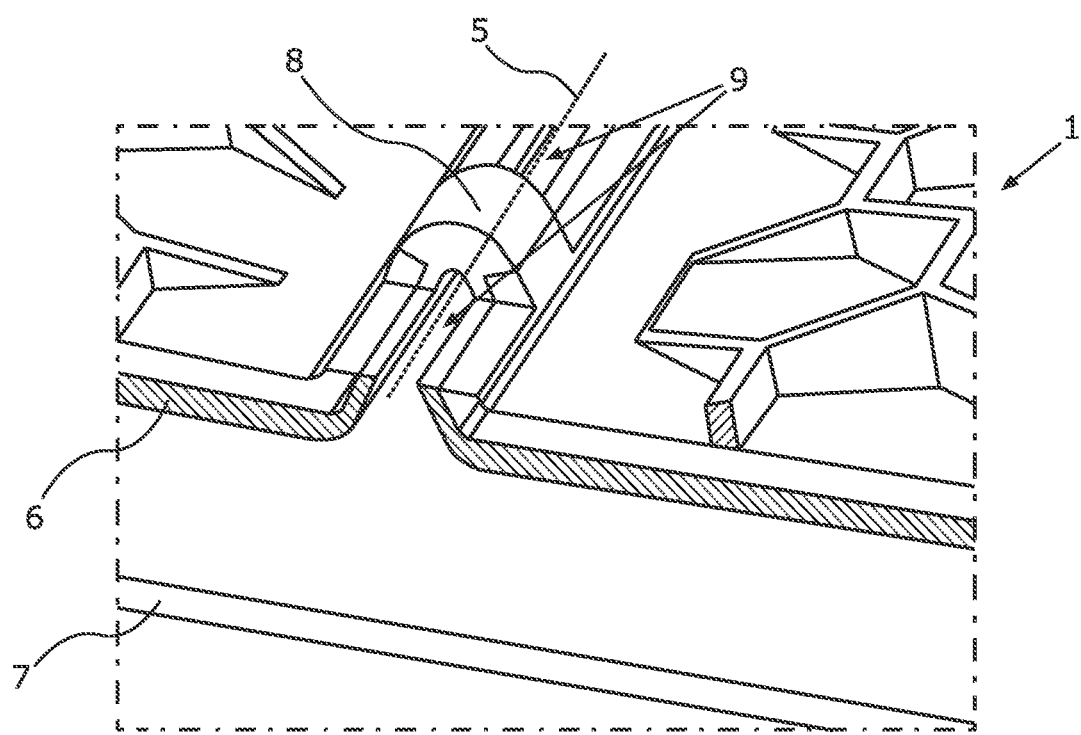
FIG. 4 shows an additional perspective detail view of the composite skin-foam-carrier component, in which gaps produced in the raised contour can be recognized in accordance with the teachings of the present disclosure.

In FIG. 4 the composite skin-foam-carrier component 1 is shown in the same perspective view as in FIG. 2. In the present view the aforementioned gaps 9 have already been produced on the raised contour 8, so that only individual segments of the raised contour 8 are left that are interspersed with the gaps 9. In the present case the raised contour 8 essentially has a type of V-section. Other groove-shaped cross-sections such as a U-shape or a trapezoidal shape are likewise possible.

The creation of the gaps 9 weakens the carrier 6 precisely along the tear line 5, namely in that area of the tear line 5 where the airbag flap 2 ruptures first when the airbag deploys. It is evident that the raised contour 8 is produced on a side of the carrier 6 facing away from the skin 7.

Figure 5:
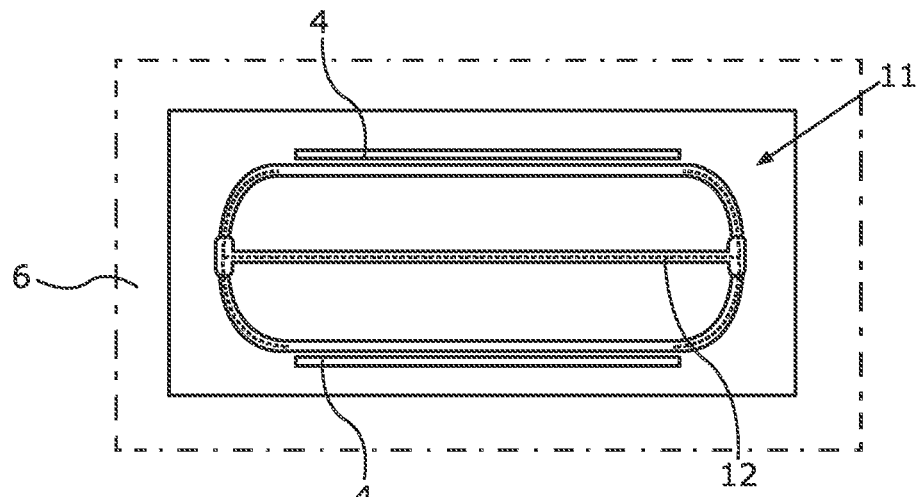
FIG. 5 shows a schematic plan view of an airbag hinge mesh that is attached to the composite skin-foam-carrier component and is overmolded in accordance with the teachings of the present disclosure.

In FIG. 5 the carrier 6 is shown in a schematic plan view; an airbag hinge mesh 11 has been arranged on the carrier. The airbag hinge mesh 11 is arranged on the carrier 6 and is overmolded with plastic, for example, so that the airbag hinge mesh 11 is securely connected to the rest of the carrier 6. For example, the airbag hinge mesh 11 may be a particularly rugged and tearproof fabric layer. The airbag hinge mesh 11 connects the airbag flap 2, which is not shown here, beyond the hinge area 4 to the rest of the substrate 6. An H-shaped slit 12 is introduced into the airbag hinge mesh 11 and corresponds at least for the most part to the shape of the tear line 5. The airbag hinge mesh 11 is positioned on the carrier 6 in such a manner that the H-shaped slit 12 fits the H-shaped tear line 5. Thus, in the area of the H-shaped slit 12 the airbag hinge mesh 11 offers no resistance to the unfolding airbag. This allows the unfolding airbag to tear open the carrier 6, beginning at the raised contour 8 interspersed with the gaps 9. If the carrier 6 tears open along the tear line 5 due to deployment of the airbag, then the airbag hinge mesh 11 connects the airbag flap 2 reliably to the carrier 6 beyond the hinge areas 4. This provides that the airbag flap 2 reliably flips open around the hinge areas 4 and is not torn off from the remaining carrier 6 in doing so. Instead of the airbag hinge mesh 11, a hinge made of sheet metal may also be used. This provides that the airbag flap 2 reliably flips open around the hinge areas 4 and is not torn off from the remaining carrier 6 in doing so.

Figure 6:
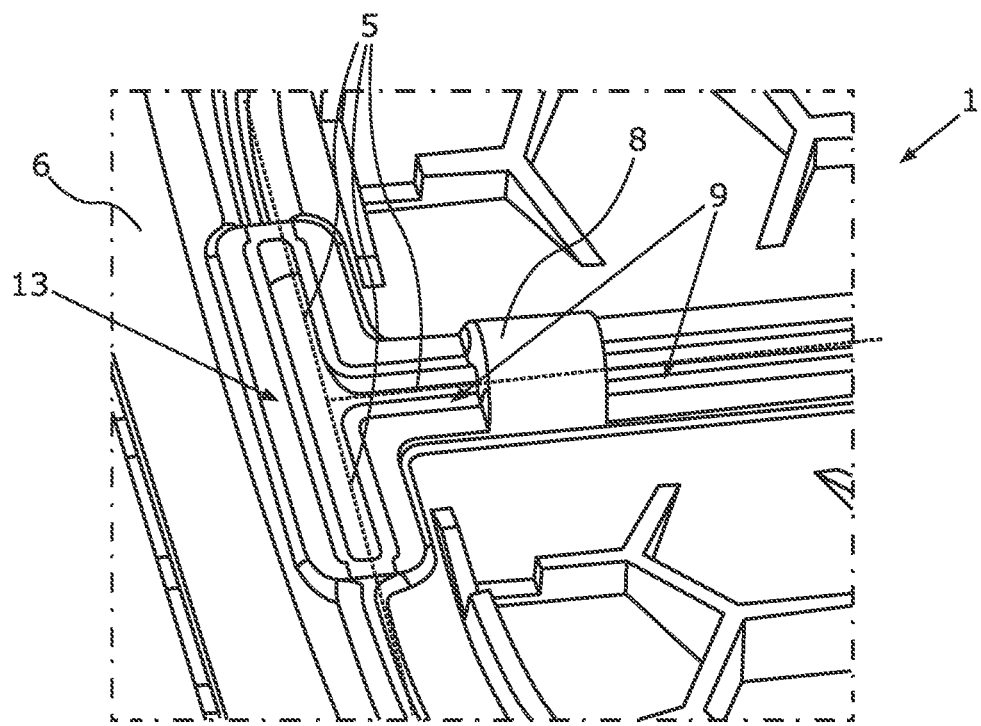
FIG. 6 shows another detail view of the composite skin-foam-carrier component, in which a T-shaped material weakening adjoins the raised contour in accordance with the teachings of the present disclosure.

FIG. 6 shows another detail of the composite skin-foam-carrier component 1. The area of the carrier 6 in which the tear line 5 opens can be recognized in this drawing. A T-shaped material weakening 13 is produced in the carrier 6 adjacent the raised contour 8, which is configured to allow the airbag flap 2 to tear open in a controlled manner along the further course of the tear line 5. Exactly the same, mirror-inverted T-shaped material weakening 13 is produced at the other longitudinal end of the raised contour 8. Thus, when the airbag flap 2 first tears in the area of the raised contour 8 due to the gaps 9 and the point of impact of the airbag at that spot, then the tearing continues on until it reaches the T-shaped material weakenings 13, from where the tearing proceeds—according to the present drawing—upwards and downwards, following the continuing tear line 5.

Figure 7:
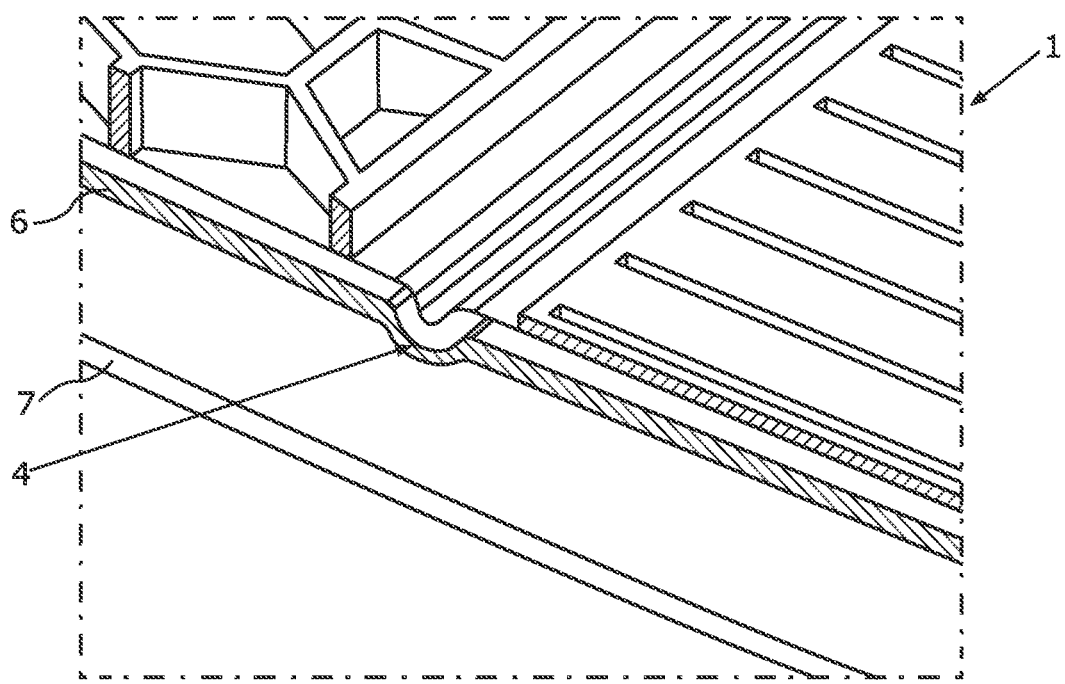
FIG. 7 shows another perspective detail view of the composite skin-foam-carrier component in which a hinge area of the airbag flap of the carrier is designed as a type of wave-shaped depression in accordance with the teachings of the present disclosure.

Finally, FIG. 7 shows another detail of the composite skin-foam-carrier component 1, in which one of the two hinge areas 4 is recognizable. The hinge areas 4 are produced in the shape of a depression extending into the foam layer not seen here. In other words, the hinge areas 4 protrude on the side of the carrier 6 that faces the skin 7. In addition, the hinge areas 4 are thinner than the rest of the carrier 6. This wave-shaped contour of the hinge areas 4 with their smaller cross-section makes it easier for the airbag flap 2 to fold over around the hinge areas 4.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of producing a composite skin-foam-carrier component for a motor vehicle comprising:
   injection-molding a carrier having at least one airbag flap delimited by a hinge area and a specified tear line, wherein a raised contour with a groove-shaped cross-section is created along a segment of the specified tear line;
   producing a foam layer between a skin and the injection-molded carrier, wherein the raised contour is produced on a side of the carrier facing away from the skin; and
   producing gaps in the raised contour by guiding a tool over the raised contour after producing the foam layer and removing a portion of the raised contour, wherein when producing the gaps, the tool is repeatedly guided transversely, particularly in wavy lines, over the raised contour.

2. The method according to claim 1, wherein in the groove-shaped cross-section of the raised contour is produced in a shape of a V-section, a U-section, or a trapezoidal section.

3. The method according to claim 1, wherein the raised contour is produced on a side of the carrier facing away from the skin.

4. The method according claim 1, wherein at least one airbag hinge mesh and an airbag hinge sheet metal is attached to the carrier and connects the at least one airbag flap to a remainder of the carrier beyond the hinge area.

5. The method according to claim 4, wherein the airbag hinge mesh is produced at least partly slit in an area in which the at least one airbag hinge mesh is arranged on the specified tear line.

6. The method according to claim 1, wherein a material weakening is produced on the carrier adjacent the raised contour, and the material weakening extends along an additional segment of the specified tear line.

7. The method according to claim 1, wherein the hinge area is produced in a shape of a depression protruding into the foam layer.

8. The method according to claim 1, wherein the hinge area is produced with a lesser thickness than the airbag flap.

9. The method according to claim 1, wherein the specified tear line is predefined in such a manner that an H-shaped or a U-shaped airbag flap is formed.

10. A method of producing a composite skin-foam-carrier component for a motor vehicle comprising:
    injection-molding a carrier having at least one airbag flap delimited by a hinge area and a specified tear line, wherein a raised contour with a groove-shaped cross-section is created along a segment of the specified tear line;
    producing a foam layer between a skin and the injection-molded carrier, wherein the raised contour is produced on a side of the carrier facing away from the skin; and
    producing gaps in the raised contour by guiding a tool over the raised contour after producing the foam layer and removing a portion of the raised contour, wherein at least one airbag hinge mesh and an airbag hinge sheet metal is attached to the carrier and connects the at least one airbag flap to a remainder of the carrier beyond the hinge area.

11. The method according to claim 10, wherein in the groove-shaped cross-section of the raised contour is produced in a shape of a V-section, a U-section, or a trapezoidal section.

12. The method according to claim 10, wherein the raised contour is produced on a side of the carrier facing away from the skin.

13. The method according to claim 10, wherein the at least one airbag hinge mesh is produced at least partly slit in an area in which the at least one airbag hinge mesh is arranged on the specified tear line.

14. The method according to claim 10, wherein a material weakening is produced on the carrier adjacent the raised contour, and the material weakening extends along an additional segment of the specified tear line.

15. A method of producing a composite skin-foam-carrier component for a motor vehicle comprising:
injection-molding a carrier having at least one airbag flap delimited by a hinge area and a specified tear line, wherein a raised contour with a groove-shaped cross-section is created along a segment of the specified tear line;
producing a foam layer between a skin and the injection-molded carrier, wherein the raised contour is produced on a side of the carrier facing away from the skin; and
producing gaps in the raised contour by guiding a tool over the raised contour after producing the foam layer and removing a portion of the raised contour, wherein the hinge area is produced with a lesser thickness than the airbag flap.

16. The method according to claim 15, wherein when producing the gaps, the tool is repeatedly guided transversely, particularly in wavy lines, over the raised contour.

17. The method according to claim 15, wherein in the groove-shaped cross-section of the raised contour is produced in a shape of a V-section, a U-section, or a trapezoidal section.

18. The method according to claim 15, wherein the raised contour is produced on a side of the carrier facing away from the skin.

19. The method according claim 15, wherein at least one airbag hinge mesh and an airbag hinge sheet metal is attached to the carrier and connects the at least one airbag flap to a remainder of the carrier beyond the hinge area.

20. The method according to claim 19, wherein the at least one airbag hinge mesh is produced at least partly slit in an area in which the airbag hinge mesh is arranged on the specified tear line.

* * * * *